United States Patent
VanBecelaere

(10) Patent No.: US 11,900,907 B2
(45) Date of Patent: Feb. 13, 2024

(54) DUAL DENSITY ACOUSTIC INSULATION

(71) Applicant: Hobbs Bonded Fibers NA, LLC, Waco, TX (US)

(72) Inventor: Karl VanBecelaere, Waco, TX (US)

(73) Assignee: Hobbs Bonded Fibers NA, LLC, Waco, TX (US)

(*) Notice: Subject to any disclaimer, the term of this patent is extended or adjusted under 35 U.S.C. 154(b) by 518 days.

(21) Appl. No.: 17/323,387

(22) Filed: May 18, 2021

(65) Prior Publication Data
US 2021/0358466 A1 Nov. 18, 2021

Related U.S. Application Data

(60) Provisional application No. 63/026,341, filed on May 18, 2020.

(51) Int. Cl.
*G10K 11/162* (2006.01)
*B60R 13/08* (2006.01)
*D04H 1/46* (2012.01)

(52) U.S. Cl.
CPC ............ *G10K 11/162* (2013.01); *B60R 13/08* (2013.01); *D04H 1/46* (2013.01); *D10B 2201/02* (2013.01); *D10B 2321/021* (2013.01)

(58) Field of Classification Search
CPC ........ G10K 11/162; B60R 13/08; D04H 1/46; D10B 2321/02; D10B 2321/021; D10B 2201/02

See application file for complete search history.

(56) References Cited

U.S. PATENT DOCUMENTS

| | | | | |
|---|---|---|---|---|
| 5,292,460 | A * | 3/1994 | Kyutoku | D04H 1/425 |
| | | | | 264/122 |
| 6,109,389 | A * | 8/2000 | Hiers | B60R 13/083 |
| | | | | 181/290 |
| RE39,260 | E * | 9/2006 | Byrd | G10K 11/16 |
| | | | | 181/290 |
| 7,448,468 | B2 * | 11/2008 | Czerny | B60R 13/0861 |
| | | | | 181/210 |
| 7,878,301 | B2 * | 2/2011 | Gross | D04H 1/43828 |
| | | | | 181/290 |
| 9,747,883 | B2 * | 8/2017 | Demo | G10K 11/162 |
| 10,607,589 | B2 * | 3/2020 | Arvidson | B32B 3/30 |
| 11,143,071 | B2 * | 10/2021 | Skestone | B32B 7/12 |
| 2003/0116379 | A1 * | 6/2003 | Khambete | B32B 11/04 |
| | | | | 181/290 |
| 2006/0289231 | A1 * | 12/2006 | Priebe | B32B 27/12 |
| | | | | 181/290 |

\* cited by examiner

*Primary Examiner* — Forrest M Phillips
(74) *Attorney, Agent, or Firm* — John A. Powell; Naman, Howell, Smith & Lee, PLLC

(57) ABSTRACT

A dual layer nonwoven acoustic insulating material having a more densified layer and a less densified layer that is comprised of shoddy fibers and other fibers.

20 Claims, 1 Drawing Sheet

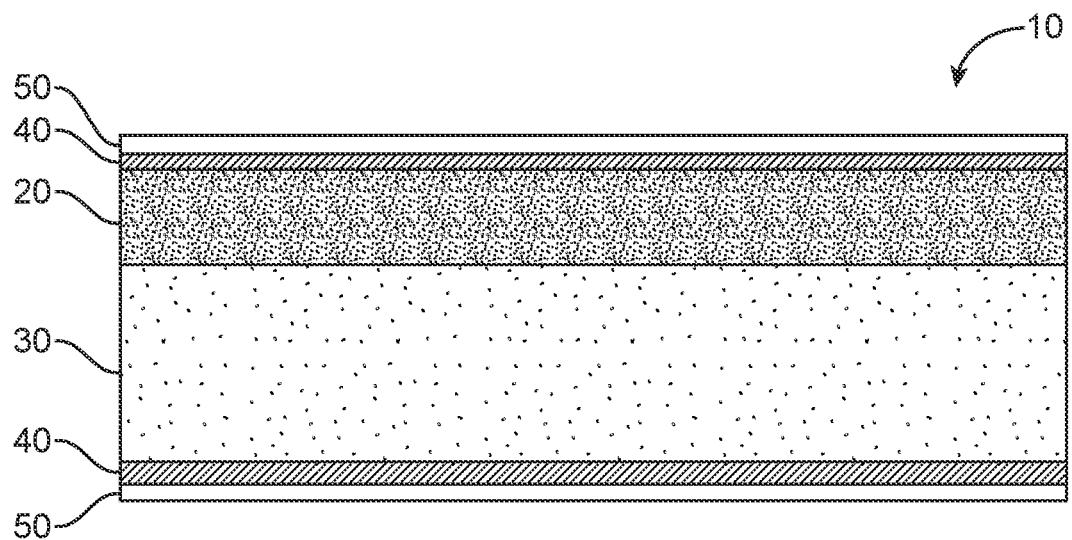

US 11,900,907 B2

DUAL DENSITY ACOUSTIC INSULATION

PRIORITY CLAIM

This application claims priority to U.S. Provisional Application No. 63/026,341 filed on May 18, 2020, which is hereby incorporated by reference.

TECHNICAL FIELD OF THE INVENTION

The present invention is generally directed to acoustic insulating materials and nonwoven batting or felt compositions that are used in the automotive industry and in other similar fields for acoustical dampening through absorption of sound waves and blocking of sound waves produced by running engines, various machines, or component parts that generate noise while they are functioning, and also to dampen noise produced by vehicles travelling over roadways or through the air.

BACKGROUND OF THE INVENTION

In the automotive industry, aviation industry, and other industries in which it is important to acoustically insulate cabins holding people from the noise generated by running engines and other machine parts or components the engine compartment that generate sound waves or to insulate from the noise created by the vehicle moving over a roadway or through the air, felt materials or nonwoven batting compositions have been used to dampen and contain the noise so that drivers, pilots, and passengers positioned in the cabin can have a more pleasurable experience than what would otherwise occur if they were exposed to the wide range of frequencies of audible sound waves generated by such running engines and machine and component parts or the noise incident to travel over a roadway or through the air. Typically, felt pads or batting comprised of one or more layers of felt or batting material are placed between the engine compartment or outside walls and the passenger cabin in order to prevent or at least significantly decrease, the amount of noise that could otherwise be heard by people located in the cabin as a result of the engine and other machine parts and components located in the engine compartment being in operation or as a result of travel over the road surface or through air. For instance, an inner dash dissipative acoustic insulation may be used between the engine compartment of a car or truck and the front dash board that faces cabin occupants in the car or truck. As another example, such Materials can be used as a carpet underlayment on the floors of a vehicle's cabin.

Such dissipative acoustic insulation may also be used under the hood of an automotive vehicle above the engine in order to reduce noise caused by the running engine that would otherwise be heard by cabin occupants or others who might be positioned outside of the automotive vehicle. Other areas where such acoustic insulation may be used in cars, trucks, or SUVs would be under upholstery in the cabin, as trunk side trim and as part of the trunk load floor, and as wheel arch liners for both the front and back wheel wells. In those types of applications, the acoustic insulation material is primarily used to reduce noise created from the vehicle and its tires as they move across the road surface (similar to the floor carpet underlayment application discussed in the preceding paragraph). Thus, dissipative acoustic insulation comprised of one or more layers of nonwoven felt or batting material may be used in a wide variety of locations in cars, trucks, SUVs, airplanes, and similar automotive vehicles in order to dampen, reduce, or arrest audible sound waves for the benefit of drivers, pilots, passengers, and cabin occupants generally.

SUMMARY OF THE INVENTION

The present invention is a dissipative acoustic insulation material comprised of a nonwoven felt material that is a batting material having dual density regions, and with top and bottom planar surfaces of the material being sealed with adhesive or resin to prevent delinting or fiber migration. The main portion of the nonwoven felt material/batting material is comprised of a fiber blend that is a mixture made up of the following: 1) shoddy fibers (which are a blend of various recycled clothing fibers that could be wool, cotton, polyester, rayon or other types of fibers from shredded clothing, rags, towels, the majority of such shoddy blend being comprised of cotton fibers); 2) low melt binder fibers (such as low melt polyester fibers having a melting point in the range of 110° C.-200° C. or Bico or PET fibers); and 3) polyester fibers. In a preferred embodiment, the fiber blend is 35% to 60% by weight shoddy fibers, 20% to 40% by weight low melt polyester fibers, and with the balance (if any) being comprised of polyester fibers. In another embodiment, the fiber blend is 35% to 60% by weight shoddy, 25% to 40% PET, and with the balance (if any) being comprised of polyester fibers. In some embodiments, resin is added to the fiber blend such that the total resulting fiber blend mixture contains between 7% and 20% by weight of added resin. The fiber blend (and resin in some embodiments, as discussed above) is rigorously mixed together, and then the fiber blend mixture is run through garnets to lap layers of fibers to form an initial intermediate version of the material, and then that intermediate version of the material is run through a first needle loom that tacks the material all the way through the entire thickness of the material.

Importantly for purposes of this invention, after the initial tacking using the first needle loom discussed above, the material is then run through a second needle loom that performs a second tacking of only a top portion of the material to create a more densified top layer (also called "top portion") within the material. The second needle loom needles only the top 10% to top 50% of the total thickness of the material. In one embodiment, the second needle loom needles between one-third and one-half of the total thickness of the material so that the top one-third to one-half of the material will have a greater density than the bottom one-half to two-thirds of the material, in a preferred embodiment, the second needle loom only needles the top ⅓ of the material so that the top densified layer comprises the top ⅓ of the material.

In an additional potential embodiment of the process, the second needle loom could be run at a higher rpm than the first needle loom so that the needles re-tacking the top portion of the material have a higher stroke rate as they re-tack the top portion of the material, which increases the density of the top portion of the material even further, creating an even more densified top layer that extends up to 10% to 50% of the total thickness of the material. Optionally, the second needle loom could also use more needles or a different type of needle to increase fiber density in the top portion of the material.

After the second needling occurs, the non-woven material has dual density regions comprised of the more dense top layer (also called "top region") that was re-tacked by the second needle loom, and the less dense bottom layer (also called "bottom region") that is the remainder of the thickness of the material that was not re-tacked by the second needle loom.

After the second needle loom performs its function in creating a more dense top layer, the top planar surface of the top layer is sprayed with resin and a fire retardant and run through an oven that is at least 300° F. for curing. Afterwards, the bottom of the material is sprayed with a resin (preferably a lighter coating than the top layer) and also with fire retardant, and then the material is again cured in an oven at a temperature of at least 300° F. In actual practice, the material is heated three times for curing purposes using a three-pass oven that is maintained at a temperature of at least 300° F., with the top surface of the material being sprayed with resin and fire retardant prior to the first pass through the three-pass oven, the bottom surface of the material being sprayed with a lighter coating of resin and fire retardant and passed a second time through the three-pass oven, and with a third pass through the three-pass oven. A three-pass oven is not necessary to practice the invention, but is just one step in a potential embodiment of the process to make the material.

Following heating in the oven to cure the resin and fire retardant on the top and bottom planar surfaces of the material, the material is then run through heated calender rolls, with no significant pressure (very little pressure) placed on the material by the calender rolls. The calender rolls will be heated to above 80° C. (above 200° F.).

The result of the manufacturing process described above is a one-piece, dual density acoustic insulation material in which the top region is more dense than the bottom region of the material. The more dense top region will be the top 1/10 to top 1/2 of the thickness of the material, and that densified top region Will have a density within the range of $$675 \frac{\text{grams}}{\text{m}^2} \text{ to } 1,125 \frac{\text{grams}}{\text{m}^2}.$$

in a preferred embodiment, the densified top layer comprises the top 1/3 of the thickness of the material and has an average density of $$900 \frac{\text{grams}}{\text{m}^2}.$$

The less dense bottom region will be the bottom 1/2 to bottom 9/10 of the thickness of the material, and that less dense bottom region will have a density within the range of $$225 \frac{\text{grams}}{\text{m}^2} \text{ to } 375 \frac{\text{grams}}{\text{m}^2}.$$

In the preferred embodiment, the bottom region comprises the bottom 2/3 of the thickness of the material and has an average dens $$\text{of } 300 \frac{\text{grams}}{\text{m}^2}.$$

In some embodiments, polypropylene can be added to the blended material that forms the main components of the material, or to the sprayed-on resin that is sprayed on the surfaces of the material, or may be added to both. In such embodiments, the polypropylene added to the material and/or to the resin sprayed on the main planar surfaces of the material would serve as an additional binder and would also aid in increased molding efficiency for the end-use customers who will use the material for acoustic insulation inside vehicles where the material must be molded into specific shapes.

The invention and process described are advantageous, in part, because a single material with dual density comprised, at least in part, of recycled fiber content such as shoddy material that is a majority recycled cotton fibers contributes to the recycling of fiber materials such as used clothing, rags, towels, etc., while providing a single material with an excellent sound dampening capability over a wide range of sound frequencies. Using mechanical means to increase the density of a portion of the material in comparison to the remainder of the material so that there is a more dense region on one side of the material (top region) and a less dense region on the other side of the material (bottom region) also avoids the need to use large amounts of the more expensive low melt binder fibers in order to create a more dense region, such as low melt polyester or "Bico" fibers or PET fibers that might otherwise be used in much greater amounts. The process of using a second needling for the top layer, in combination with spraying resin on the top layer and curing that resin, creates a stiffer, firmer top surface that has greater density but can still be molded into areas within vehicles where sound dampening is desirable.

The resin used on both the top and bottom planar surfaces of the material during manufacturing (and that may also comprise up to 7% to 20% of the initial fiber blend mixture) can be any suitable polymer-based dry resin that may be combined with water and applied via spray nozzles. In a preferred embodiment, a vinyl chloride co- or terpolymer resin, such as a copolymer of vinyl acetate, ethylene, and vinyl chloride (dispersion in water), may be used, for instance, the VINNOL® CE 35 product manufactured by Wacker Chemie AG. The fire retardant used on both the top and bottom planar surfaces of the material can be any suitable fire retardant, such as an intumescent, phosphorous, nitrogen, phosphorous/phosphonate, phosphorous/nitrogen, phosphate/phosphorous/bromine, phosphate/phosphonate ester, bromine, bromine/chlorine, or similar type flame retardant for fiber applications, for instance, Eaglebran FRA-7227 by Eagle Performance Products of Calhoun, GA is used in the preferred embodiment. The main requirement for the fire retardant is that it must enable the material to be able to pass the FMVSS 302 automotive nonwoven burn test.

In actual practice, the resin that is sprayed on the top and bottom planar surfaces prior to heating/curing in an oven(s) may be combined with the fire retardant and sprayed on concurrently as a single spray, or they may be sprayed on consecutively as separate sprayed layers.

With regard to all envisioned embodiments, the invention can generally be described as a dual density layer acoustic insulation batting material that is the result of a carded or garneted combing operation that develops a nonwoven fiber batt using two needle looms to create different density layers, spray bonded adhesive (or resin) to seal the top and bottom of the batt material (to prevent loose fiber linting or fiber migration) and incorporating a fire retardant additive to enable the material to pass the FMVSS 302 test, with the material being passed through one or more ovens to cure and/or seal the material and sealed again via heated calender rolls to help pass end-use customers' various acoustic insulating standards. The use of longer fibers in the garret ting or carding procedure will offer better strength in terms of the end-use customers' molding operations than an airlay process would offer.

DESCRIPTION OF THE DRAWING

FIG. 1 is a side view of the preferred embodiment of the dissipative acoustic insulation 10 manufactured by the methods outlined in this specification. The first embodiment of the dissipative acoustic insulation 10 is comprised of a densified insulating layer 20, a less dense insulating layer 30, and sprayed-on resin 40 and sprayed-on fire retardant 50 that are sprayed on both the top and bottom planar surfaces of the dissipative acoustic insulation 10. As illustrated in FIG. 1, the densified insulating layer 20 in a preferred embodiment is the top ⅓ of the total thickness of the overall dissipative acoustic insulation 10, and the densified insulating layer 20 has a density that is within a certain range, for example only, in a preferred embodiment the densified insulating layer 20 may have an average density of $$900 \; \frac{\text{grams}}{\text{m}^2},$$

while in the preferred embodiment the less dense insulating layer 30 is the bottom ⅔ of the thickness of the dissipative acoustic insulation 10, and it has an average density of only $$300 \; \frac{\text{grams}}{\text{m}^2}.$$

FIG. 1 and these descriptions of a preferred embodiment should not be read in a limiting sense, but are merely provided as an illustrative example of one embodiment that the inventor prefers at this time.

FIG. 1 is intended as a simple illustration of one embodiment of the dissipative acoustic insulation 10 that is manufactured using the methods/processes discussed above. The embodiment illustrated in FIG. 1 is intended to illustrate some of the features, aspects, and advantages of the present invention, with father elaboration found in the above descriptions and in the appended claims. Where terms such as "top", "bottom", "front", "back", "first", "second", "third", "end", "ends", "side", "sides", "edge", "edges" and similar terms are used herein, it should be understood that, unless otherwise specifically stated or otherwise made specifically clear by context, these terms have reference only to the structure shown in the drawing as it would appear to a person viewing the drawing, and such terms are utilized in order to facilitate describing the invention and in order to facilitate a better understanding of the invention.

The terms "needle punching" and "needling" are treated as synonymous and have the same meaning as used in this specification. Needle punching/needling is a process step used in nonwoven manufacturing that mechanically entangles fibers to produce a bonded, nonwoven fabric through repeated penetration of the barbed needles of a needle loom into a fiber blend/fiber mixture. Needle punching/needling results in entanglement and mechanical interlocking of the fibers that yields a strong mechanical bond between and among the fibers that gives the nonwoven material increased mechanical strength and density. A needle punching/needling step may involve repeated penetration of the fiber blend/fiber mixture at a certain rate (certain number of penetrations per period of time), and this needling/needle punching occurs as the nonwoven material is passed by, through, under, or above the needle loom that punches the material with multiple needles. Needle looms often punch fibers with the barbed punching needles at a rate of 600-2,000 punches per minute, but this rate can be increased up or down, depending on the application.

The term "binder fiber" is synonymous with "binding fiber" and may comprise a single type of fiber or may comprise multiple, types of fibers. Binder fibers may be selected from any number of fibers that melt at least partially during exposure to temperatures between about 100° C. to 200° C., HTLM polyesters, PET, and polyolefins, such as polyethylene and polypropylene, may serve as binder fibers. The term "Bico" stands for bicomponent fiber, which may also be used as a binder fiber. A bicomponent fiber includes two components, a first component that melts at a first temperature and a second component that melts at a second, higher temperature. It is typical that the first melting temperature that is associated with the first component of the bicomponent fiber will normally be a melting temperature between about 100° C. to 200° C. The second melting temperature, which is associated with the second component of the bicomponent fiber, will normally be relatively higher, and typically it will be above the temperature that the whole bicomponent fiber is expected to survive during manufacturing and the material's useful life. A bicomponent fiber may have any manner of arrangement of the two components that provides an intimate combination of the two components. For instance, the bicomponent fiber may have a core and sheath arrangement, an eccentric core and sheath arrangement, a pie arrangement, an islands-in-the-sea arrangement, a striped arrangement, a side-by-side arrangement, or a lobed arrangement.

Although the invention has been described with reference to specific embodiments, this description is not meant to be construed in a limiting sense. Various modifications of the disclosed embodiments, as well as alternative embodiments of the invention, will be apparent to persons skilled in the art upon reference to the description of the invention that is provided in this specification. It is, therefore, contemplated that the appended claims will cover such modifications and variations that fall within the scope of the invention.

What we claim is:

1. An acoustic insulation material that is a nonwoven felt sheet comprised of:
   a mixture of shoddy fibers, low melt binder fibers, and polyester fibers that has gone through a first needling step;
   a first layer of the nonwoven felt sheet that is a layer with a certain thickness;
   a second layer of the nonwoven felt sheet that is a layer comprised of the remaining thickness of the sheet;
   wherein the first layer has greater density than the second layer.

2. The acoustic insulation material of claim 1, wherein the first layer comprises 10% to 50% of the total thickness of the sheet and the second layer comprises the remainder of the thickness of the sheet.

3. The acoustic insulation material of claim 1, wherein the greater density of the first layer is the result of a purely mechanical process during manufacturing of the material.

4. The acoustic insulation material of claim 3, wherein the purely mechanical process that results in the greater density of the first layer is a second needling step in which Only the first layer is needled a second time.

5. The acoustic insulation material of claim 1, wherein over 50% of the shoddy fibers are cotton fibers.

6. The acoustic insulation material of claim 1, wherein the low melt binder fibers are low melt polyester fibers.

7. The acoustic insulation material of claim 1, wherein the low melt binder fibers are bicomponent fibers.

8. The acoustic insulation material of claim 1, wherein the low melt binder fibers are PET fibers.

9. The acoustic insulation aerial of claim 1, wherein the mixture of fibers is comprised of:
35% to 60% by weight shoddy fibers;
20% to 40% by weight low melt binder fibers;
with any remaining balance of the mixture of fibers being comprised of polyester fibers.

10. The acoustic insulation material of claim 9, wherein resin is added to the mixture of fibers until 7% to 20% by weight of the resulting mixture is comprised of resin.

11. An acoustic insulation material that is a nonwoven batt comprised of:
shoddy fibers, low melt binder fibers, and polyester fibers that have undergone an initial needle punching operation;
wherein a first region comprising one-third (⅓) to one-half (½) of the thickness of the batt has greater density than a second region comprising the remaining two-thirds (⅔) to one-half (½) of the thickness of the batt.

12. The acoustic insulation material of claim 11, wherein the greater density of the first region in comparison to the second region is the result of a purely mechanical process during manufacture of the batt.

13. The acoustic insulation material of claim 12, wherein the purely mechanical process resulting in greater density of the first region is a subsequent needle punching operation in which only one-third (⅓) to one-half (½) of the thickness of the batt is subjected to the subsequent needle punching operation.

14. The acoustic insulation material of claim 11, wherein the batt is comprised of:
35% to 60% by weight shoddy fibers;
20% to 40% by weight low melt binder fibers;
with any remaining balance being comprised of polyester fibers.

15. The acoustic insulation material of claim 11, wherein the batt is comprised of:
35% to 60% by weight shoddy fibers;
20% to 40% by weight low melt hinder fibers;
7% to 20% by weight resin;
with the remaining balance, if any, being comprised of polyester fibers.

16. An acoustic insulation material that is a nonwoven material comprised of:
a first region comprised of a first thickness of the material;
a second region comprised of a second thickness of the material;
wherein the first region is denser than the second region;
wherein the greater density of the first region is a result of a purely mechanical process during manufacturing of the nonwoven material.

17. The acoustic insulation material of claim 16, wherein the first region is 10% to 50% of the total thickness of the nonwoven material.

18. The acoustic insulation of claim 17, wherein the density of the first region is within the range of $$675 \frac{\text{grams}}{\text{m}^2} \text{ to } 1{,}125 \frac{\text{grams}}{\text{m}^2}.$$

19. The acoustic insulation of claim 17, wherein the density of the second region is within the range of $$225 \frac{\text{grams}}{\text{m}^2} \text{ to } 375 \frac{\text{grams}}{\text{m}^2}.$$

20. The acoustic insulation material of claim 17, wherein:
the density of the first region is within the range of $$675 \frac{\text{grams}}{\text{m}^2} \text{ to } 1{,}125 \frac{\text{grams}}{\text{m}^2};$$

the density of the second region is within the range of $$225 \frac{\text{grams}}{\text{m}^2} \text{ to } 375 \frac{\text{grams}}{\text{m}^2};$$

the material is comprised of 35% to 60% by weight shoddy fibers;
the material is comprised of 20% to 40% by weight low melt binder fibers;
the material is comprised of 7% to 20% by weight resin;
the remaining balance of the material, if any, is comprised of polyester fibers;
a majority of the shoddy fibers are recycled cotton fibers;
at least one external planar surface of the material is sprayed with a fire retardant and a resin.

* * * * *